US012525187B2

(12) United States Patent
Park et al.

(10) Patent No.: US 12,525,187 B2
(45) Date of Patent: Jan. 13, 2026

(54) DISPLAY DEVICE AND DRIVING METHOD THEREOF

(71) Applicant: LG Display Co., Ltd., Seoul (KR)

(72) Inventors: Yong Kyu Park, Paju-si (KR); Dae Hyun Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/909,738

(22) Filed: Oct. 8, 2024

(65) Prior Publication Data

US 2025/0166563 A1 May 22, 2025

(30) Foreign Application Priority Data

Nov. 20, 2023 (KR) ........................ 10-2023-0160972

(51) Int. Cl.
*G09G 3/3233* (2016.01)

(52) U.S. Cl.
CPC ....... *G09G 3/3233* (2013.01); *G09G 2310/08* (2013.01); *G09G 2330/023* (2013.01)

(58) Field of Classification Search
CPC ............... G09G 3/3233; G09G 3/3275; G09G 2310/08; G09G 2330/023; G09G 2330/021; G09G 5/10; G09G 2360/16
See application file for complete search history.

(56) References Cited

U.S. PATENT DOCUMENTS

| | | | | |
|---|---|---|---|---|
| 11,302,256 | B2 | 4/2022 | Kwon et al. | |
| 2012/0306947 | A1* | 12/2012 | Kim | G09G 3/3233 345/694 |
| 2019/0066593 | A1* | 2/2019 | Ishii | G09G 3/3233 |
| 2021/0193047 | A1 | 6/2021 | Kwon et al. | |

FOREIGN PATENT DOCUMENTS

| | | | |
|---|---|---|---|
| KR | 10-2020-0079695 | A | 7/2020 |
| KR | 10-2021-0080998 | A | 7/2021 |

* cited by examiner

*Primary Examiner* — Brent D Castiaux
(74) *Attorney, Agent, or Firm* — Fenwick & West LLP

(57) ABSTRACT

A display device includes a display panel including a plurality of pixels, each of the plurality of pixels having a light-emitting element that emits light based on current that corresponds to a data voltage, and a timing controller configured to set level of a supply voltage of the display panel for displaying input image data, set an automatic current limit (ACL) value of the display panel based on the level of the supply voltage, and adjust a luminance gain of the input image data based on the ACL value to generate the data voltage.

17 Claims, 10 Drawing Sheets

DISPLAY DEVICE AND DRIVING METHOD THEREOF

CROSS-REFERENCE TO RELATED APPLICATION

This application claims the priority from Republic of Korea Patent Application No. 10-2023-0160972, filed on Nov. 20, 2023, which is hereby incorporated by reference in its entirety.

BACKGROUND

Field

The present disclosure relates to a display device and a method of driving the same.

Discussion of Related Art

An organic light emitting diode display (hereinafter referred to as "OLED display device") is a self-luminous device that emits light in an organic light-emitting layer by recombination of electrons and holes, and is expected to be used as a next-generation device since the OLED display device has high luminance and low driving voltage, and may be formed into an ultra-thin film.

Each pixel included in the OLED display device has an OLED and a pixel circuit that independently drives the OLED. The pixel circuit controls brightness of the OLED by adjusting a current used for a thin film transistor (TFT) to drive the OLED according to a data voltage. A driving TFT supplies a high-potential voltage EVDD to the OLED, and may control the amount of current flowing to the OLED according to a voltage difference between a source and a gate caused by the data voltage.

The high-potential voltage EVDD supplied to a pixel is supplied to have a sufficiently large voltage level to be able to supply both a driving voltage of the driving TFT applied to a source-drain electrode of the driving TFT and a driving voltage of the OLED. Accordingly, to reduce power consumption, dynamic power control (DPC) technology, which controls the high-potential voltage EVDD according to an input image, has been applied.

A conventional OLED display device only controls a level of the high-potential voltage EVDD, and thus when high luminance is required, the level of the high-potential voltage EVDD rises, resulting in an increase in maximum power consumption. Therefore, there is a problem that costs increase since an expensive, high-power EVDD power supply circuit needs to be provided.

SUMMARY

Accordingly, the present disclosure is directed to a display device and a method of driving the same that substantially obviate one or more problems due to limitations and disadvantages of the related art.

The present disclosure provides a display device and a method of driving the same capable of reducing power supply circuit costs by lowering maximum power consumption when variably controlling an EVDD level.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a display device includes a display panel including a plurality of pixels, each of the plurality of pixels having a light-emitting element that emits light based on current that corresponds to a data voltage, and a timing controller configured to set a level of a supply voltage of the display panel (e.g., an EVDD level) for displaying input image data, set an automatic current limit (ACL) value of the display panel according to the level of the supply voltage, and adjust a luminance gain of the input image data according to the ACL value to generate the data voltage.

The timing controller may set the ACL value to be inversely proportional to a change in the level of the supply voltage.

The timing controller may set the ACL value so that a target power calculated as a product of the level of the supply voltage and the ACL value is constant.

The timing controller may be configured to detect a peak luminance of the input image data based on a peak luminance control (PLC) curve that defines a peak luminance of the plurality of pixels based on an average picture level (APL) of a frame of the input image data, set the level of the supply voltage in units of the frame based on the detected peak luminance, and set the ACL value in units of the frame based on the level of the supply voltage to generate the data voltage of the input image data.

The timing controller may calculate a target power based on the level of the supply voltage and an ACL value, wherein the level of the supply voltage and the ACL value are set when the APL is at a maximum level (e.g., 100%), and set the ACL value so that the target power is maintained with the ACL value inversely proportional to a change in the level of the supply voltage.

The timing controller may calculate a target power based on the level of the supply voltage and an ACL value, wherein the level of the supply voltage and the ACL value are set when the APL is at a minimum level (e.g., 0%), and set the ACL value so that the target power is maintained with the ACL value inversely proportional to a change in the level of the supply voltage.

The timing controller may detect a peak luminance of a PLC curve that is set in the input image data to set the ACL value and a level of the supply voltage for displaying the input image data, and set the ACL value to be inversely proportional to a change in the level of the supply voltage when the level of the supply voltage changes according to a change of the PLC curve.

The timing controller may include a peak luminance detector configured to detect the peak luminance of the input image data, a first controller (e.g., an EVDD controller) configured to set the level of the supply voltage based on the peak luminance to output a supply voltage level setting signal, a second controller (e.g., an ACL controller) configured to set the ACL value based on the level of the supply voltage, and a data voltage generator configured to adjust the luminance gain of the input image data based on the ACL value to generate the data voltage.

The peak luminance detector may include a third controller (e.g., an APL calculation & PLC controller) configured to detect a peak luminance of the input image data based on a PLC curve that defines a peak luminance of the plurality of pixels according to an APL of a frame of the input image data.

The peak luminance detector may include a PLC peak luminance detector configured to detect a peak luminance of a PLC curve that is set in the input image data.

The second controller may calculate a target power based on the level of the supply voltage and an ACL value, wherein the level of the supply voltage and the ACL value are set when the APL is at a maximum level (e.g., 100%), and set the ACL value so that the target power is maintained with the ACL value inversely proportional to a change in the level of the supply voltage.

The second controller may calculate a target power based on the level of the supply voltage and an ACL value t, wherein the level of the supply voltage and the ACL value are set when the APL is at a minimum level (e.g., 0%), and set the ACL value so that the target power is maintained with the ACL value inversely proportional to a change in the level of the supply voltage.

In one or more other embodiments of the present disclosure, a method of controlling a display device including a display panel including a plurality of pixels, each of the plurality of pixels having a light-emitting element that emits light based on current that corresponds to a data voltage includes detecting a peak luminance of input image data, setting a level of a supply voltage of the display panel for displaying the input image data based on the detected peak luminance, setting an ACL value of the display panel so that a target power value calculated as a product of the level of the supply voltage and the ACL value is constant, and adjusting a luminance gain of the input image data based on the ACL value to generate the data voltage.

The setting of the ACL value may include setting the ACL value to be inversely proportional to a change in the level of the supply voltage.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
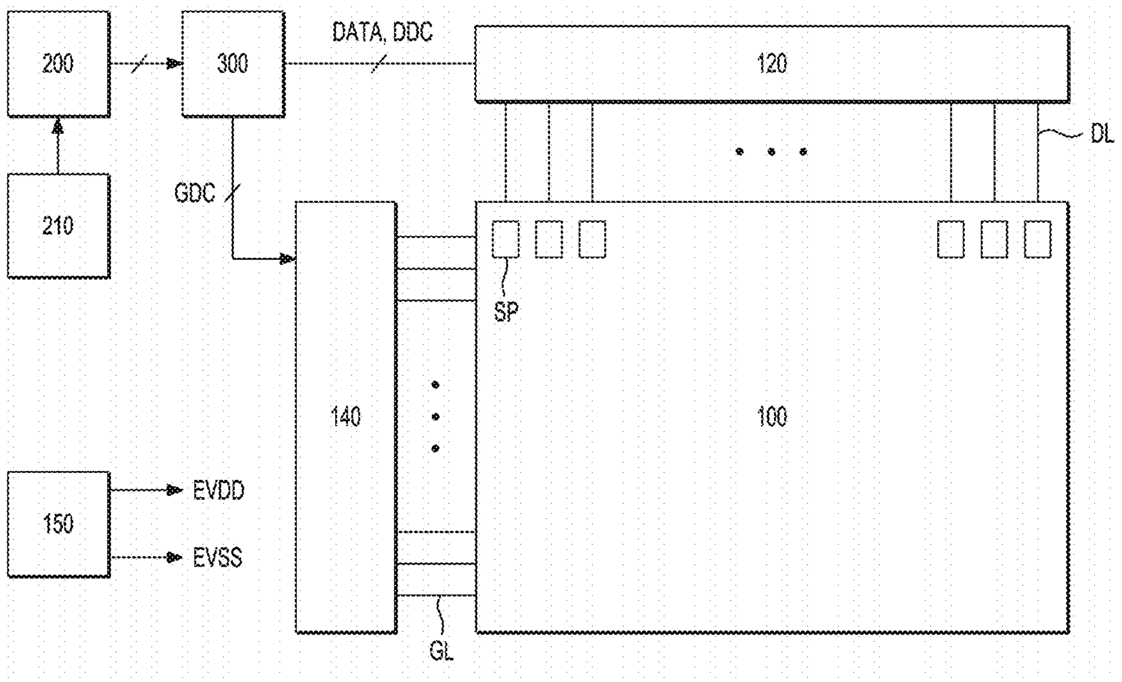
FIG. 1 is a block diagram schematically illustrating a configuration of a display device according to one or more embodiments of the present disclosure.

The advantages and features of the present disclosure, and the method for achieving the advantages and features will become apparent with reference to embodiments described below in detail in conjunction with the accompanying drawings. However, the present disclosure is not limited to the embodiments disclosed below and may be implemented in a variety of different forms, and the present embodiments allow the present disclosure to be complete and are provided to fully inform those of ordinary skill in the art to which the present disclosure pertains of the scope of the disclosure.

The shapes, sizes, proportions, angles, numbers, etc. disclosed in the drawings for describing the embodiments of the present disclosure are illustrative, and thus the present disclosure is not limited to the illustrated elements. The same reference symbols refer to the same elements throughout the disclosure. When "including", "having", "comprising", etc. are used in this s disclosure, other parts may also be present, unless "only" is used. When an element is expressed in the singular, the case including the plural is included unless explicitly stated otherwise.

In interpreting an element, it is to be interpreted as including an error range even when there is no separate explicit description thereof.

In the case of a description of a positional relationship, for example, when a positional relationship between two parts is described using "on", "above", "below", "next to", etc., one or more other parts may be located between the two parts, unless "immediately" or "directly" is used.

Although "first", "second", etc. are used to describe various elements, these elements are not limited by these terms. These terms are merely used to distinguish one element from another. Accordingly, a first element mentioned below may be a second element within the spirit of the present disclosure.

The same reference numerals refer to substantially the same elements throughout the disclosure. Hereinafter, embodiments of the present disclosure will be described in detail with reference to the attached drawings. In the following description, when it is determined that a detailed description of the notice function or structure related to the present disclosure may unnecessarily obscure the gist of the present disclosure, the detailed description is omitted.

Figure 2:
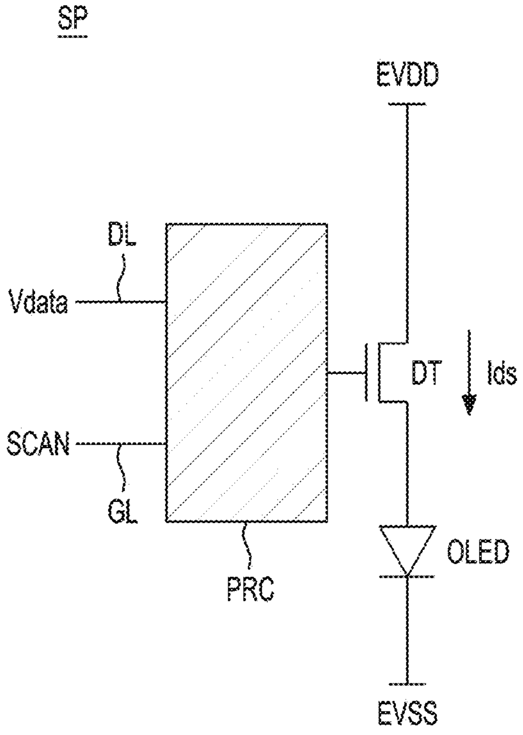
FIG. 2 is a configuration diagram schematically illustrating a subpixel illustrated in FIG. 1 according to one or more embodiments of the present disclosure.

FIG. 1 is a block diagram schematically illustrating a configuration of a display device according to one or more embodiments of the present disclosure, and FIG. 2 is a configuration diagram schematically illustrating a subpixel illustrated in FIG. 1 according to one or more embodiments of the present disclosure.

Referring to FIG. 1, the display device according to one or more embodiments of the present disclosure may include a host system 200, a user input unit 210, a display panel 100, a data driver 120, a gate driver 140, a power supply 150, and a timing controller 300.

The host system 200 may be implemented as a variety of systems, such as a television system, a set-top box, a navigation system, a DVD player, a Blu-ray player, a personal computer, a home theater system, and a phone system. The host system 200 converts image data supplied from the outside or image data stored in an internal memory into a format suitable for the resolution of the display panel 100. The host system 200 may transmit a timing control signal along with image data to the timing controller 300. The timing control signal may include a vertical synchronization signal, a horizontal synchronization signal, etc. related to the image data.

The host system 200 may receive a luminance mode for selecting overall luminance of an image through the user input unit 210. The host system 200 may adjust luminance of image data according to the luminance mode selected through the user input unit 210 and then provide the image data to the timing controller 300.

The user input unit 210 may be implemented as a key button, a keypad, a touchpad, a keyboard, a mouse, an on-screen display (OSD), a remote controller having a wireless communication function, etc.

The timing controller 300 generates a data timing control signal DDC for controlling the operation timing of the data driver 120 and a gate control signal GDC for controlling the operation timing of the gate driver 140 based on the timing control signal input from the host system 200. The timing controller 300 may supply a data signal DATA supplied from the host system 200 along with the data timing control signal DDC to the data driver 120, and supply the gate control signal GDC to the gate driver 140. The timing controller 300 may be formed as an IC (Integrated Circuit) and mounted on a printed circuit board, but is not limited thereto.

The data driver 120 may sample and latch the data signal DATA in response to the data timing control signal DDC supplied from the timing controller 300, convert the digital data signal into an analog data voltage based on a gamma reference voltage, and output the converted analog data voltage. In addition, when a data voltage VDATA is supplied from the timing controller 300, the data driver 120 may supply the corresponding data voltage VDATA to a subpixel SP included in the display panel 100 through a data line DL. The data driver 120 may be formed as an IC and mounted on the display panel 100 or on a printed circuit board, and some or all of components thereof may be built into the timing controller 300. However, the present disclosure is not limited thereto.

The gate driver 140 may output a scan signal in response to the gate timing control signal GDC supplied from the timing controller 300. The gate driver 140 may supply at least one scan signal to the subpixel SP included in the display panel 100 through the gate line GL. The gate driver 140 may be formed as an IC or directly on the display panel 100 using a gate-in-panel method.

The display panel 100 includes a plurality of data lines DL and a plurality of gate lines GL formed to intersect each other, and subpixels SP are arranged in a matrix form in intersection areas, respectively, to form a pixel array. As illustrated in FIG. 2, the subpixel SP may include an OLED, a driving element DT, and a programming circuit PRC. The OLED emits light with brightness proportional to a driving current Ids. The OLED may include, but is not limited to, an organic light-emitting layer. The programming circuit PRC includes a first switch connected to the data line DL, at least one second switch connected to the gate line GL, at least one capacitor, etc. to set a gate-source voltage of the driving element DT in accordance with a driving condition. The driving element DT generates a driving current Ids in accordance with the driving condition and supplies the driving current Ids to the OLED. The data voltage Vdata may be reflected in the gate-source voltage of the driving element DT, and the high-potential voltage EVDD may be reflected in a drain-source voltage of the driving element DT. Accordingly, the data voltage Vdata and the high-potential voltage EVDD may affect the magnitude of the driving current Ids that determines the luminance of the subpixel SP.

The power supply 150 may convert power supplied from the outside into power required to drive the display device and output the power under the control of the timing controller 300. For example, the power supply 150 may convert power supplied from the outside into a high-potential voltage EVDD, a low-potential voltage EVSS, etc. and output the voltage, and may generate and output a voltage required to drive the gate driver 140 (for example, a gate voltage including a gate high voltage and a gate low voltage), a voltage required to drive the data driver 120 (a drain voltage including a drain voltage and a half-drain voltage), etc.

To reduce power consumption, the display device according to one or more embodiments of the present disclosure, having this configuration, may perform a DPC operation to vary an EVDD level (i.e., a level of a supply voltage) of the display panel 100 according to the peak luminance set in an input image and vary ACL in conjunction with changes in EVDD.

To perform the DPC operation, the timing controller 300 may analyze an image input from the host system 200 in units of one frame and detect an APL. The timing controller 300 may set peak luminance of each of pixels according to the detected APL. The peak luminance according to the APL may be set according to a preset PLC curve.

Figure 3:
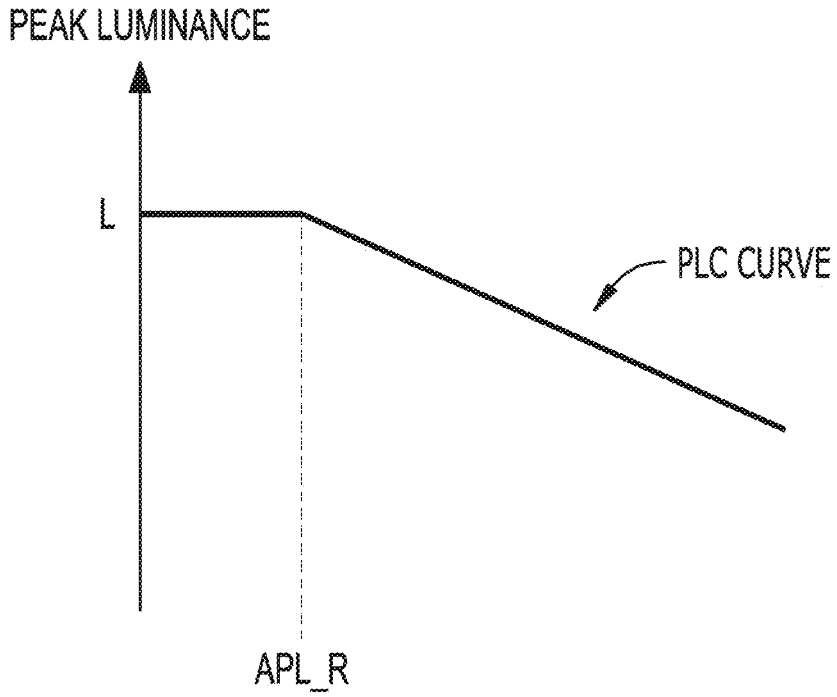
FIG. 3 is a diagram illustrating a PLC curve defined for PLC driving according to one or more embodiments of the present disclosure.

FIG. 3 is a diagram illustrating a PLC curve according to one or more embodiments of the present disclosure. The PLC curve defines peak luminance of a pixel according to an APL, and subpixels SP of the display panel 100 emit light at luminance less than or equal to peak luminance limited by the PLC curve.

Referring to FIG. 3, in a coordinate system where a vertical axis is peak luminance and a horizontal axis is APL, the PLC curve maintains the peak luminance at a maximum value in a section where the APL is less than a preset reference APL (APL_R). In a section where the APL is greater than the preset reference APL (APL_R), the luminance value is defined so that the peak luminance of pixels decreases as the APL increases.

That is, when the APL is high, the corresponding target peak luminance is low, and conversely, when the APL is low, the corresponding target peak luminance is high. In this way, the higher the APL of one screen, the lower the peak luminance of the screen, thereby reducing power consumption. The PLC curve may be preset and stored according to luminance, current, driving characteristics, etc. of the display panel 100.

The timing controller 300 may calculate the APL of one frame image and set the peak luminance of the frame based on the PLC curve. The timing controller 300 may obtain an EVDD level according to the peak luminance of each frame by applying pre-stored EVDD setting information according to the PLC curve. The EVDD level according to the peak luminance may have a similar form to the PLC curve. That is, as the APL becomes larger (the image becomes brighter), the peak luminance and the EVDD level may gradually decrease, and as the APL becomes smaller (the image becomes darker), the peak luminance and the EVDD level may gradually increase. The timing controller 300 may control the EVDD level by controlling the power supply 150 according to the EVDD setting information according to the peak luminance.

Meanwhile, each subpixel SP uses switching of the driving transistor according to the data voltage to control the magnitude of the current Ids flowing to the OLED by EVDD, causing the OLED to emit light at desired luminance, thereby displaying an image. Therefore, the current flowing through the display panel 100 varies depending on the input image. For example, in the case of a full black image, little current flows through the display panel 100, but in the case of a full white image, a lot of current flows through the display panel 100. Accordingly, when power required for the display panel 100 (power (P)=voltage (V)*current (I)) increases, and thus the power supply 150 outputs high power greater than or equal to a certain value, a phenomenon in which the power is turned off occurs. To prevent this phenomenon, ACL that controls the current flowing through the display panel 100 may be applied.

Figure 4:
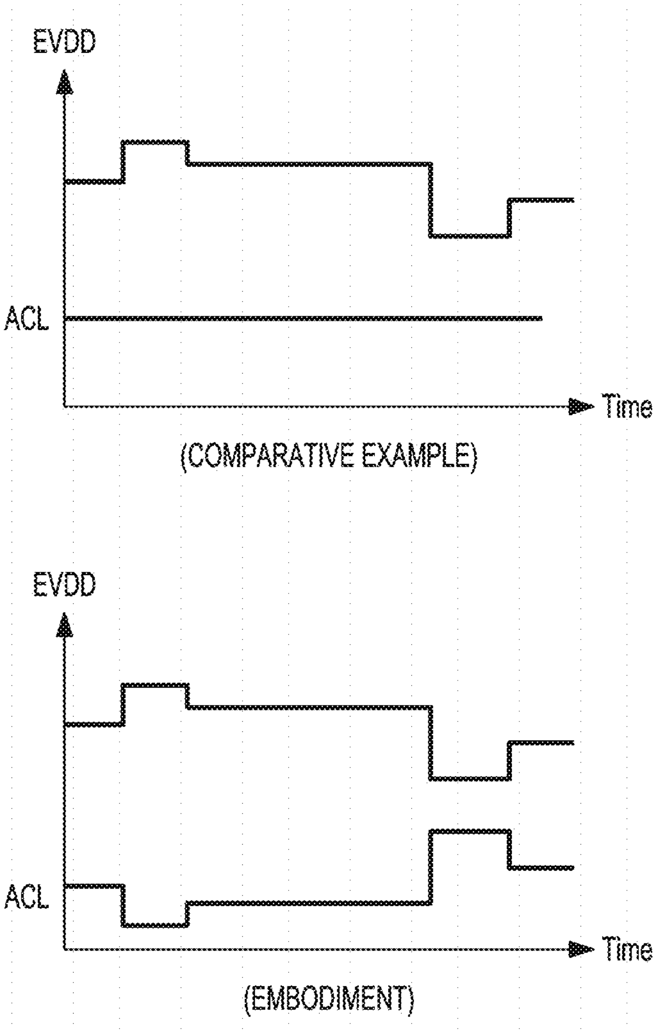
FIG. 4 is graphs illustrating methods of controlling an EVDD level and an ACL value of a comparative example and an embodiment of the present disclosure according to one or more embodiments of the present disclosure.

FIG. 4 is graphs illustrating methods of controlling an EVDD level and an ACL value of a comparative example and an embodiment of the present disclosure according to one or more embodiments of the present disclosure.

Referring to the graph of the comparative example of FIG. 4, the existing display device kept the ACL value constant while performing the DPC operation that variably controls the EVDD level according to the APL of the input image.

Referring to the graph of the embodiment of FIG. 4, the display device of one or more embodiments of the present disclosure may variably control the ACL value in conjunction with the change in EVDD level. Since voltage and current are inversely proportional to each other for a certain value of power, when the EVDD level is high, the ACL value needs to be kept low. However, when the EVDD level is lowered, a margin to increase the ACL value is ensured.

Accordingly, the display device of one or more embodiments of the present disclosure may perform a control operation to decrease the ACL value when the EVDD level increases and to increase the ACL value when the EVDD level decreases. The ACL value may be set to be inversely proportional to the EVDD level.

Figure 5A:
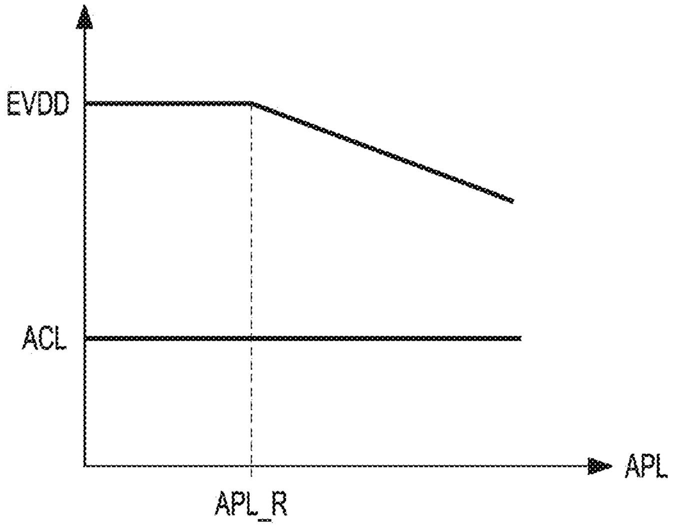
FIGS. 5A-5B are graphs illustrating a method of controlling the EVDD level and the ACL value according to the comparative example and a resultant change in power according to one or more embodiments of the present disclosure.
Figure 5B:
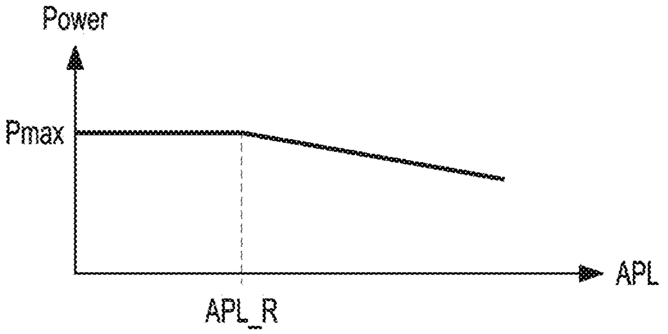

FIGS. 5A-5B are graphs illustrating a method of controlling the EVDD level and the ACL value according to the comparative example and a resultant change in power according to one or more embodiments of the present disclosure.

Referring to FIG. 5A, the display device according to the comparative example maintains the EVDD level at a maximum value in a section where the APL is less than the reference APL (APL_R). In a section where the APL is greater than the preset reference APL (APL_R), a control operation is performed so that the EVDD level decreases as the APL increases. The display device according to the comparative example maintains the ACL constant even when the EVDD level changes.

FIG. 5B is a graph calculating power consumed when controlling the EVDD level and the ACL value according to the graph of FIG. 5A. The power may be calculated as voltage (EVDD)*current (ACL). According to the comparative example, since the ACL is maintained at a constant value, the power has a maximum value (Pmax) in a section where the APL at which the EVDD level is maintained at a maximum value is less than the reference APL (APL_R). In a section where the APL is greater than the reference APL (APL_R), as the APL increases and the EVDD level decreases, the power also decreases.

Figure 6A:
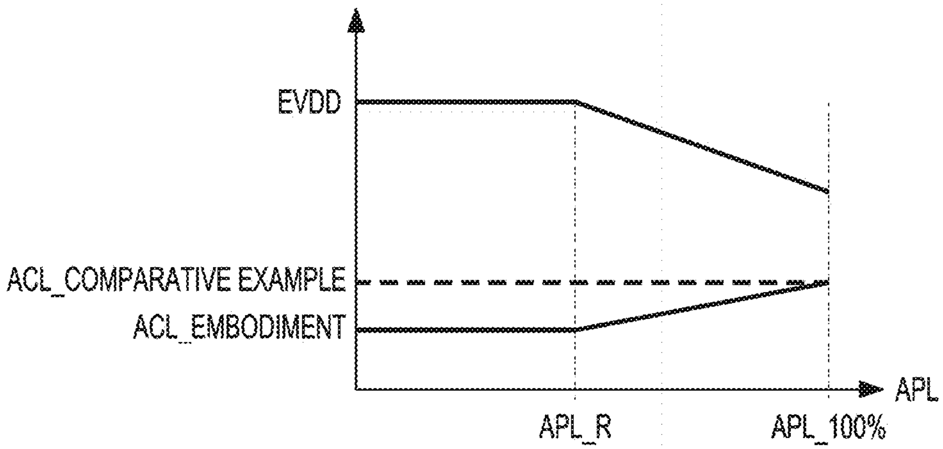
FIGS. 6A-6B are graphs illustrating a method of controlling the EVDD level and the ACL value according to a first embodiment of the present disclosure and a resultant change in power according to one or more embodiments of the present disclosure.
Figure 6B:
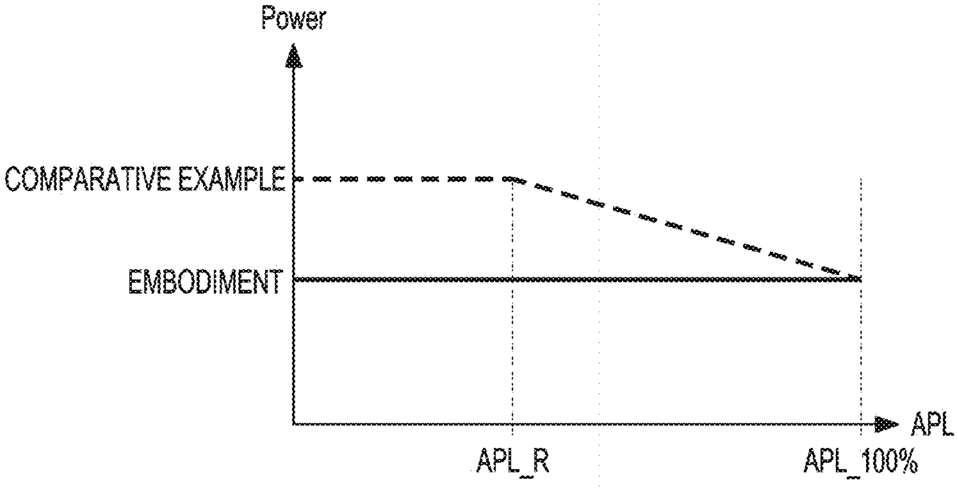

FIGS. 6A-6B are graphs illustrating a method of controlling the EVDD level and the ACL value according to a first embodiment of the present disclosure and a resultant change in power according to one or more embodiments of the present disclosure.

Referring to FIG. 6A, the display device according to the first embodiment maintains the EVDD level at a maximum value in a section where the APL is less than the reference APL (APL_R). In a section where the APL is greater than the preset reference APL (APL_R), a control operation is performed so that the EVDD level decreases as the APL increases.

In the display device according to the first embodiment, the ACL value is set in inverse proportion to the EVDD level. Therefore, in the section where the APL is less than the reference APL (APL_R), the ACL value remains constant, and in the section where the APL is greater than the preset reference APL (APL_R), as the EVDD level decreases, the ACL value increases in inverse proportion to the EVDD level.

In the first embodiment, referring to a maximum value of the ACL value, an ACL value when the APL is 100% (APL_100%) corresponding to a screen through which the most current flows through the display panel may be set to the maximum value. Therefore, power when the APL is 100% (EVDD_100%*ACL_100%) may be the maximum power (Pmax). In a section (APL_xx %) where the APL is less than 100%, EVDD is variably controlled to a preset value, and thus it is possible to calculate the ACL value according to EVDD in a section (APL_xx %) where the APL is less than 100% (APL_100%) based on the maximum power (Pmax) (ACL_xx %=Pmax/EVDD_xx %). For example, when the APL is 80% (APL_80%), the ACL value (ACL_80%) may be calculated by calculating the EVDD level (EVDD_80%) and Pmax set when the APL is 80% (Pmax/EVDD_80%).

FIG. 6B is a graph calculating power when the EVDD level and the ACL value are controlled according to the graph of FIG. 6A. In the first embodiment, since the ACL value is adjusted to be inversely proportional to the EVDD level based on the maximum power (Pmax), the power value is kept constant at Pmax.

In the first embodiment, since the maximum power (Pmax) is set to the ACL value when the APL is 100%, the ACL value is set lower than that of the embodiment in the section where the APL is less than the reference APL (APL_R). As a result, as illustrated in FIG. 6B, the maximum power (Pmax) may be set lower than that of the comparative example. Accordingly, there is no need to provide an expensive power supply circuit for supplying high power, and the cost of the power supply circuit may be reduced. In addition, the maximum power may be reduced to improve the effect of reducing power consumption.

Figure 7A:
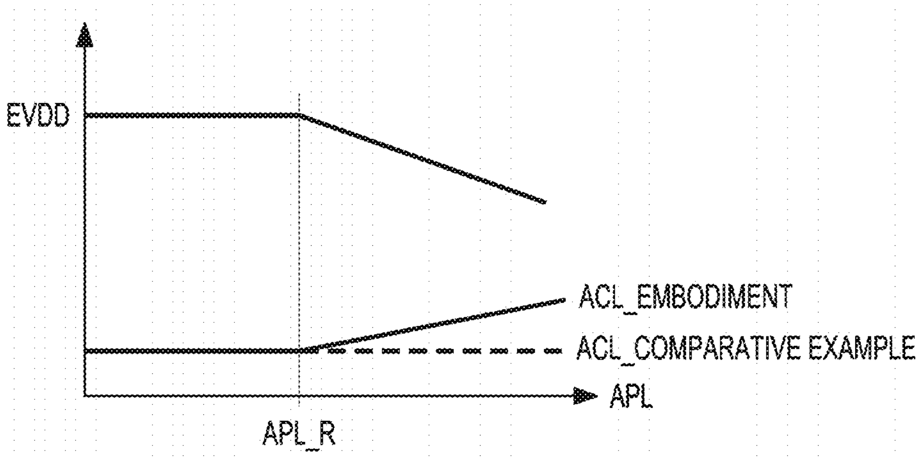
FIGS. 7A-7B are graphs illustrating a method of controlling the EVDD level and the ACL value according to a second embodiment of the present disclosure and a resultant change in power according to one or more embodiments of the present disclosure.
Figure 7B:
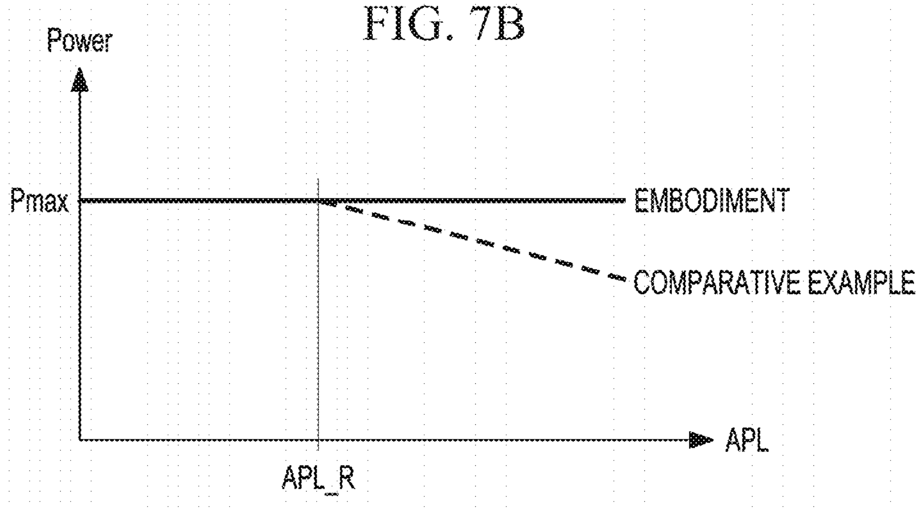

FIGS. 7A-7B are graphs illustrating a method of controlling the EVDD level and the ACL value according to a second embodiment of the present disclosure and a resultant change in power according to one or more embodiments of the present disclosure. A difference from the first embodiment is that the maximum power (Pmax) is set based on when the APL is 0%.

Referring to FIG. 7A, the display device according to the second embodiment maintains the EVDD level at a maximum value in a section where the APL is less than the reference APL (APL_R). In a section where the APL is greater than the preset reference APL (APL_R), a control operation is performed so that the EVDD level decreases as the APL increases.

In the display device according to the second embodiment, the ACL value is set in inverse proportion to the EVDD level. Therefore, in the section where the APL is less than the reference APL (APL_R), the ACL value remains constant, and in the section where the APL is greater than the preset reference APL (APL_R), as the EVDD level decreases, the ACL value increases in inverse proportion to the EVDD level.

In the second embodiment, referring to a maximum value of the ACL value, an ACL value when the APL is 100% corresponding to a screen through which the least current flows through the display panel may be set to the maximum value. Therefore, power when the APL is 0% (EVDD_0%*ACL_0%) may be the maximum power (Pmax). In a section where the APL is greater than the preset reference APL (APL_R), the EVDD level decreases to a preset value, and thus the ACL value increases in inverse proportion to the EVDD level (ACL_xx %=Pmax/EVDD_xx %) based on the maximum power (Pmax). As a result, when the APL of the display device according to the second embodiment is 100%, the ACL value may be set to be greater than that of the comparative example. Therefore, even when the EVDD level decreases, the amount of current may be increased by increasing the ACL value, so that a decrease in luminance may be prevented even when the EVDD level decreases.

FIG. 7B is a graph calculating power when the EVDD level and the ACL value are controlled according to the graph of FIG. 7A. In the second embodiment, since the ACL value is adjusted to be inversely proportional to the EVDD level based on the maximum power (Pmax), the power value is kept constant at Pmax.

In the second embodiment, the maximum power (Pmax) is set to an ACL value when the APL is 0%, and thus in a section where the APL is greater than the reference APL (APL_R), the ACL value is set to be greater than that of the comparative example. As a result, as illustrated in FIG. 7B, in the section where the APL is greater than the reference APL (APL_R), the maximum power (Pmax) may be set to be greater than that of the comparative example. Therefore, while maintaining the power level constant, the amount of current may be increased by increasing the ACL value even when the EVDD level is reduced, so that a decrease in luminance may be prevented even when the EVDD level is reduced.

Figure 8:
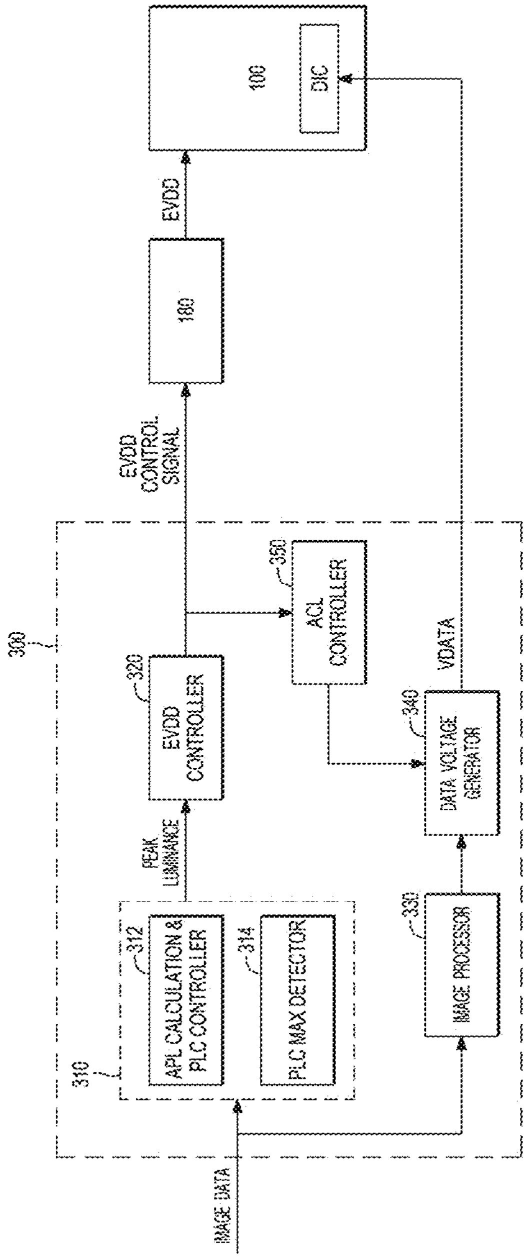
FIG. 8 is a block diagram schematically illustrating a configuration of a timing controller of a display device according to one or more embodiments of the present disclosure.

FIG. 8 is a block diagram schematically illustrating a configuration of the timing controller 300 of the display device according to one or more embodiments of the present disclosure. The timing controller 300 according to one or more embodiments of the present disclosure performs a DPC operation to vary the EVD Delve, and may variably control the ACL value in conjunction with a change in EVDD level.

Referring to FIG. 8, the timing controller 300 may include a peak luminance detector 310, an EVDD controller 320, an image processor 330, a data voltage generator 340, and an ACL controller 350.

The peak luminance detector 310 acquires peak luminance of image data supplied from the host system 200 and provides the peak luminance to the EVDD controller 320. The image data supplied from the host system 200 may be image data that needs to be displayed by variably controlling the EVDD level in units of one image frame using DPC control, or may be mode setting image data that needs to be displayed by fixing the EVDD level according to the luminance mode selected through the user input unit 210. The peak luminance detector 310 may include an APL calculation & PLC controller 312 that detects the peak luminance of the image data that needs to be displayed by variably controlling the EVDD level, and a PLC Max detector 314 that detects the peak luminance of the mode setting image data that needs to be displayed by fixing the EVDD level. Accordingly, the peak luminance detector 310 acquires the peak luminance of the image data using the APL calculation & PLC controller 312 or the PLC Max detector 314 depending on the type of image data supplied from the host system 200 and provides the acquired peak luminance to the EVDD controller 320.

The APL calculation & PLC controller 312 analyzes image data input from the host system 200 in units of one image frame and calculates the APL for each image frame. The APL calculation & PLC controller 312 may acquire the peak luminance corresponding to the APL of 1 image frame based on the previously stored PLC curve. Accordingly, the APL calculation & PLC controller 312 acquires the peak luminance in units of one image frame and provides the acquired peak luminance to the EVDD controller 320.

The PLC Max detector 314 may detect peak luminance from PLC curve data input together with the mode setting image data from the host system 200. Since the mode setting image data is displayed according to a luminance mode set by the user, the peak luminance may change when the luminance mode is changed through the user input unit 210. Accordingly, the PLC Max detector 314 acquires the peak luminance from the PLC curve data input together with the mode setting image data and provides the acquired peak luminance to the EVDD controller 320.

The EVDD controller 320 may receive input of peak luminance and determine an EVDD level required to display the peak luminance based on pre-stored EVDD setting information. The pre-stored EVDD setting information may include an EVDD level according to peak luminance, and the EVDD level according to the peak luminance may have a similar form to that of the PLC curve. The EVDD controller 320 outputs the EVDD setting information determined according to the peak luminance to the power supply 150, so that the power supply 150 may supply EVDD to the display panel 100 according to the EVDD setting information.

The ACL controller 350 may receive the EVDD setting information determined by the EVDD controller 320 and calculate an ACL value appropriate for a set EVDD level. The ACL controller 350 may calculate and set the ACL value so that, as the EVDD level decreases, the ACL value increases. The ACL controller 350 may calculate the ACL value according to the set EVDD level using a preset calculation formula. For example, the ACL controller 350 may calculate the ACL value by multiplying the target power by the reciprocal of the EVDD level. In addition, to reduce the amount of computation of the system, the ACL value according to the EVDD level may be implemented as a look-up table (LUT).

The image processor 330 may correct image data to improve image quality of the image data. For example, the image processor 330 may correct image data according to changes in the electrical characteristics of the display panel 100, but is not limited thereto.

The data voltage generator 340 may generate the data voltage VDATA according to the image data corrected by the image processor 330. When generating the data voltage VDATA, the data voltage generator 340 may adjust the luminance gain using the ACL value provided by the ACL controller 350. The ACL value is a total current value of one image frame, and is set in inverse proportion to the EVDD level according to one or more embodiments of the present disclosure. Accordingly, when the EVDD level decreases when compared to a previous frame, the ACL value increases, and thus the luminance gain may also increase. As a result, the decrease in luminance of the image displayed on the display panel 100 may be minimized or at least reduced by increasing luminance gain of luminance decreased due to a decrease in the EVDD level using the ACL. The data voltage generator 340 may output the data voltage VDATA reflecting the ACL value provided by the ACL controller 350 to the data drive IC (DIC) of the display panel 100.

The above description illustrates a case where each control block is implemented in the timing controller 300 and the timing controller 300 performs a series of control processes. However, this is only one embodiment, and a function performed by each control block may be implemented in various ways, such as by combining two or more of the host system 200, the timing controller 300, and the data driver 120, or by providing a separate control block.

Figure 9:
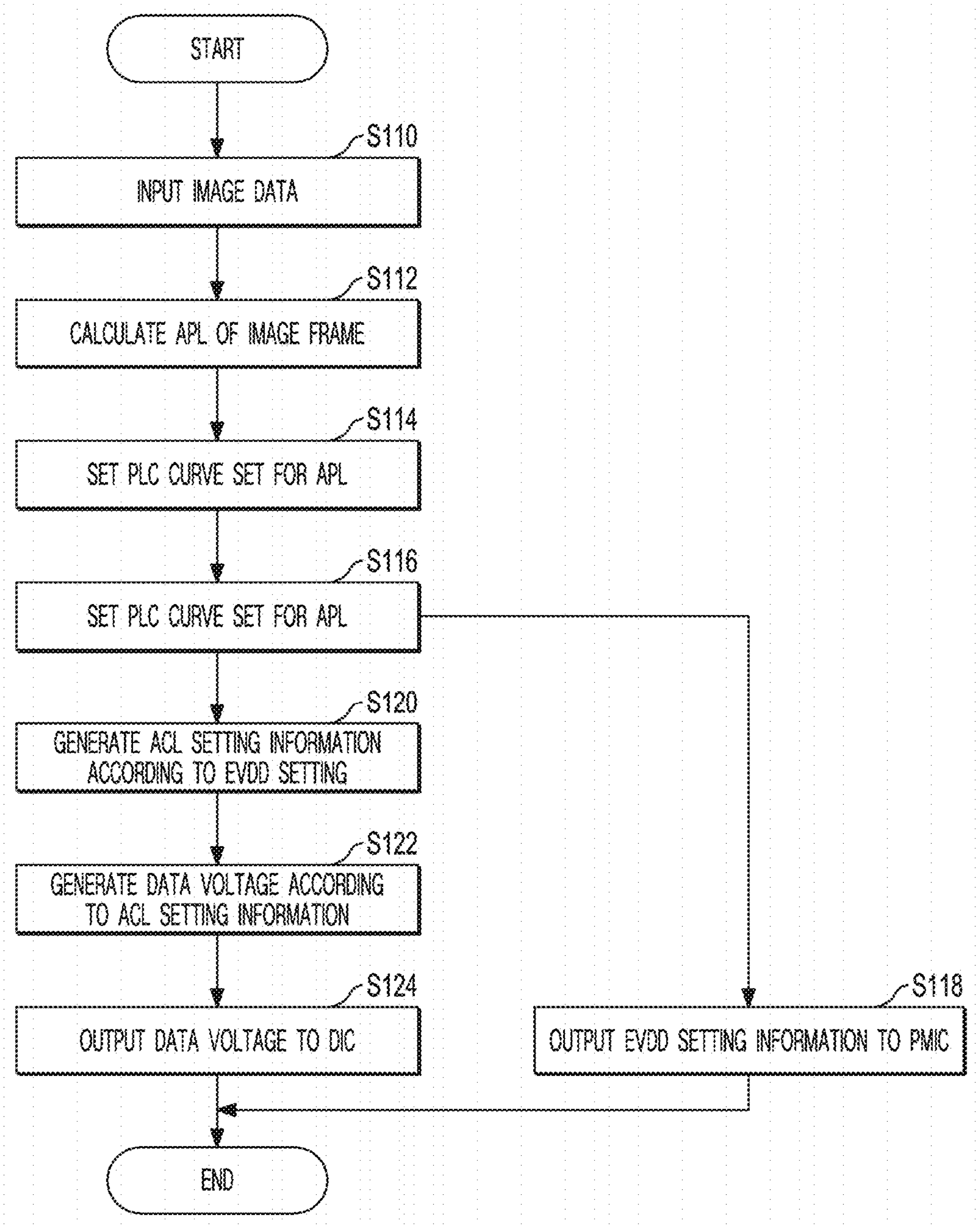
FIG. 9 is a control flowchart of a timing controller according to a first embodiment of the present disclosure.

FIG. 9 is a control flowchart of the timing controller according to the first embodiment of the present disclosure. FIG. 9 illustrates a control flow of the timing controller 300 when the image data supplied from the host system 200 is displayed by variably controlling the EVDD level in units of one image frame using DPC control in the first embodiment.

When image data is input from the host system 200 (S110), the timing controller 300 calculates the APL in units of one image frame (S112). The APL calculation & PLC controller 312 of the timing controller 300 may calculate the APL for each image frame by analyzing the input image data in units of one image frame.

The timing controller 300 acquires peak luminance according to the calculated APL (S114). The APL calculation & PLC controller 312 may acquire peak luminance according to an APL for a corresponding frame from a preset PLC curve. The PLC curve may be preset and stored according to luminance, current, driving characteristics, etc. of the display panel 100. The APL calculation & PLC controller 312 may provide the acquired peak luminance to the EVDD controller 320.

The timing controller 300 sets the EVDD level according to the peak luminance (S116). The EVDD controller 320 of the timing controller 300 may receive peak luminance and determine the EVDD level required to display the peak luminance based on pre-stored EVDD setting information. The EVDD level required according to the peak luminance may be acquired in a tentative manner and stored in advance. For example, the EVDD level according to the peak luminance may have a shape similar to that of the PLC curve. That is, as the APL becomes larger (the image becomes brighter), the peak luminance and the EVDD level may gradually decrease, and as the APL becomes smaller (the image becomes darker), the peak luminance and the EVDD level may gradually increase.

The timing controller 300 may control the EVDD level supplied to the display panel by outputting EVDD level setting information according to the peak luminance to a PMIC for power supply (S118).

In addition, the timing controller 300 may calculate the ACL value according to the EVDD level setting information (S120). The ACL controller 350 of the timing controller 300 may calculate an ACL value appropriate for the set EVDD level. The ACL controller 350 may calculate the ACL value according to the set EVDD level using a preset calculation formula, and may store the ACL value according to the EVDD level as a lookup table and apply the ACL value.

The timing controller 300 may generate a data voltage by reflecting the ACL value (S122). The data voltage generator 340 of the timing controller 300 may generate a data voltage with the luminance gain adjusted using the ACL value provided by the ACL controller 350.

The timing controller 300 may output a data voltage VDATA reflecting the ACL value to the data drive IC (DIC) of the display panel 100 (S124).

Accordingly, the display panel 100 may display an image in which the EVDD level and the ACL value are variably controlled in units of one image frame.

Figure 10A:
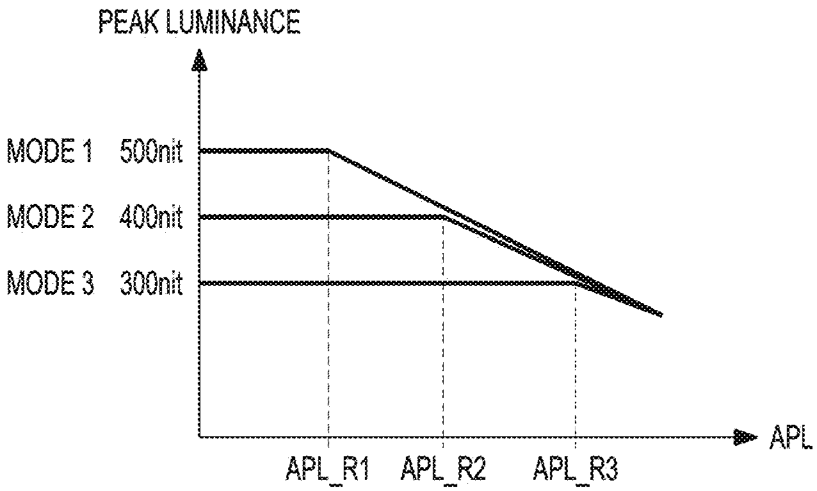
FIGS. 10A-10B are graphs illustrating characteristics of an EVDD level and a PLC curve defined according to a mode according to one or more embodiments of the present disclosure.
Figure 10B:
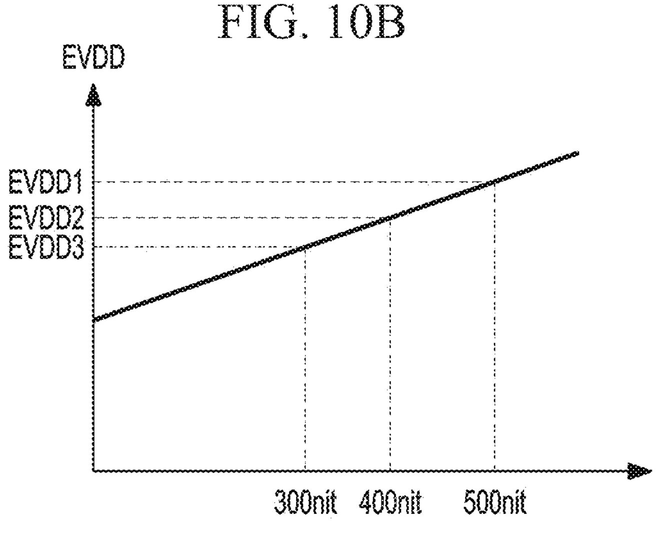
Figure 11:
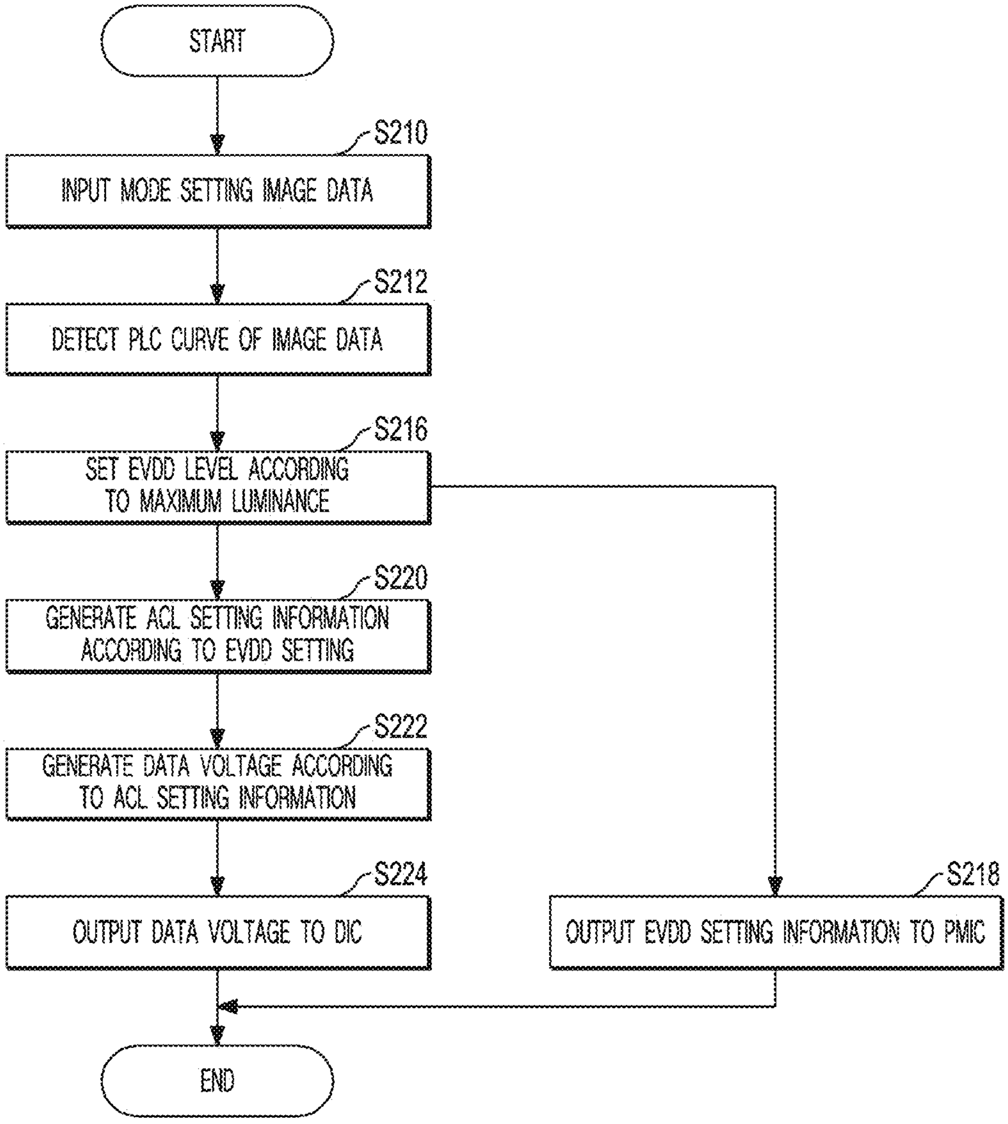
FIG. 11 is a control flowchart of a timing controller according to a second embodiment of the present disclosure.

FIGS. 10A, 10B and 11 are diagrams for describing a method of controlling a timing controller according to a second embodiment of the present disclosure. The second embodiment illustrates a control flow of the timing controller 300 when displaying mode setting image data for fixing an EVDD level according to a luminance mode selected through the user input unit 210.

The host system 200 may receive input of a luminance mode for selecting overall luminance of an image through the user input unit 210. The host system 200 may adjust luminance of image data according to the luminance mode selected through the user input unit 210 and then provide the image data to the timing controller 300. The image data whose mode is set needs to be displayed by fixing an EVDD level according to the luminance mode selected through the user input unit 210, and the EVDD level may also change when the mode is changed.

FIG. 10A-10B show graphs illustrating characteristics of an EVDD level and a PLC curve defined according to a luminance mode according to one or more embodiments of the present disclosure.

First to third luminance modes MODE1 to MODE3 may be provided depending on the peak luminance, and the user may select a desired luminance mode through the user input unit 210.

Referring to FIG. 10A, the peak luminance in the first luminance mode MODE1 may be set to 500 nits, the peak luminance in the second luminance mode MODE2 may be set to 400 nits, and the peak luminance in the third luminance mode MODE3 may be set to 300 nits.

In the first luminance mode MODE1, the PLC curve may be set so that the peak luminance is set to 500 nits in a section where the APL is less than a reference APL (APL_R1) and peak luminance of pixels decreases as the APL increases in a section where the APL is greater than the reference APL (APL_R1).

In the second luminance mode MODE2, the PLC curve may be set so that the peak luminance is set to 400 nits in a section where the APL is less than a reference APL (APL_R2) and peak luminance of pixels decreases as the APL increases in a section where the APL is greater than the reference APL (APL_R2).

In the third luminance mode MODE3, the PLC curve may be set so that the peak luminance is set to 300 nits in a section where the APL is less than a reference APL (APL_R3) and peak luminance of pixels decreases as the APL increases in a section where the APL is greater than the reference APL (APL_R3).

The user may set the luminance of the image by selecting any one of the first to third luminance modes MODE1 to MODE3.

Referring to FIG. 10B, as the peak luminance increases, the EVDD level may increase. The EVDD level required according to the peak luminance may be acquired in a tentative manner and stored in advance.

When the peak luminance of the first luminance mode MODE1 is set to 500 nits, the peak luminance of the second luminance mode MODE2 is set to 400 nits, and the peak luminance of the third luminance mode MODE3 is set to 300 nits, EVDD1 having the highest level may be set in the first luminance mode MODE1 having the highest peak luminance. In the second luminance mode MODE2 having the second highest peak luminance, EVDD2 having the second highest level may be set, and in the third luminance mode MODE3 having the lowest peak luminance, EVDD3 having the lowest level may be set.

The host system 200 may adjust the luminance of the image data by correcting the PLC curve according to the luminance mode selected through the user input unit 210 and then provide the image data and PLC curve data to the timing controller 300.

FIG. 11 is a flowchart for describing a control flow of the timing controller according to the second embodiment of the present disclosure. The second embodiment illustrates a control flow of the timing controller 300 when displaying mode setting image data that needs to be displayed by fixing an EVDD level according to a luminance mode selected through the user input unit 210.

When mode setting image data whose luminance mode is set is input from the host system 200 (S210), the timing controller 300 detects a peak luminance of a PLC curve of the image data (S212). The PLC Max detector 314 of the timing controller 300 may acquire peak luminance from PLC curve data input together with the mode setting image data from the host system 200 and provide the peak luminance to the EVDD controller 320.

The timing controller 300 sets the EVDD level according to the peak luminance (S216). The EVDD controller 320 of the timing controller 300 may receive input of the peak luminance and determine the EVDD level required to display the peak luminance based on pre-stored EVDD setting information. The EVDD level required according to the peak luminance may be acquired in a tentative manner and stored in advance.

The timing controller 300 may control the EVDD level supplied to the display panel by outputting the EVDD level setting information according to the peak luminance to the PMIC for power supply (S218).

In addition, the timing controller 300 may calculate the ACL value according to the EVDD level setting information (S220). The ACL controller 350 of the timing controller 300 may calculate an ACL value appropriate for the set EVDD level. The ACL controller 350 may calculate the ACL value according to the set EVDD level using a preset calculation formula, and may store the ACL value according to the EVDD level as a lookup table and apply the ACL value.

The timing controller 300 may generate a data voltage by reflecting the ACL value (S222). The data voltage generator 340 of the timing controller 300 may generate a data voltage whose luminance gain is adjusted using the ACL value provided by the ACL controller 350.

The timing controller 300 may output the data voltage VDATA reflecting the ACL value to the data drive IC (DIC) of the display panel 100 (S224).

Accordingly, the display panel 100 may set the EVDD level according to the luminance mode selected by the user and display an image by applying an ACL value appropriate for the set EVDD level.

As described above, the display device and the method of driving the same according to one or more embodiments of the present disclosure may variably control the EVDD level to the peak luminance set in the input image, while varying the ACL in conjunction with the change in EVDD.

The display device and the method of driving the same according to one or more embodiments of the present disclosure may set the ACL value that controls the current flowing through the display panel low when the EVDD level is high, thereby reducing maximum power consumption, so that the cost of providing an expensive power supply circuit may be saved.

The display device and the method of driving the same according to one or more embodiments of the present disclosure may improve luminance reduced due to a decrease in EVDD by setting the ACL value low when the EVDD level is high and setting the ACL value high within the limit to maintain target power consumption when the EVDD level is low, so that image quality degradation may be minimized or at least reduced while maintaining the power consumption effect.

The embodiments of the present disclosure have the following effects.

The display device and the method of driving the same according to one or more embodiments of the present disclosure may set an ACL value, which controls a current flowing through the display panel, to be low when the EVDD level is high, to reduce maximum power consumption, thereby eliminating the cost of providing an expensive power supply circuit.

The display device and the method of driving the same according to one or more embodiments of the present disclosure may improve luminance reduced due to a decrease in EVDD by setting the ACL value low when the EVDD level is high and setting the ACL value high within the limit to maintain target power consumption when the EVDD level is low, so that image quality degradation may be minimized or at least reduced while maintaining the power consumption effect.

The display device and the method of driving the same according to one or more embodiments of the present disclosure may improve efficiency of a power system by maintaining target power consumption by controlling the ACL value in inverse proportion to the change in EVDD level.

The effects of the present disclosure are not limited to the content illustrated above, and a wider variety of effects are included within the present disclosure.

Even though the embodiments of the present disclosure have been described in detail with reference to the accompanying drawings, the present disclosure is not necessarily limited to these embodiments, and may be variously modified and implemented without departing from the technical spirit of the present disclosure. Therefore, the embodiments disclosed in the present disclosure are not intended to limit the technical spirit of the present disclosure, but to describe the technical spirit, and the scope of the technical spirit of the present disclosure is not limited by these embodiments. Therefore, the embodiments described above should be understood as illustrative in all respects and not restrictive. The scope of protection of the present disclosure should be interpreted according to the scope of the claims, and all technical ideas within the equivalent scope should be interpreted as being included in the scope of rights of the present disclosure.

What is claimed is:

1. A display device, comprising:

a display panel including a plurality of pixels, each of the plurality of pixels having a light-emitting element that emits light based on current that corresponds to a data voltage; and a timing controller configured to:

set a level of a supply voltage of the display panel for displaying input image data, set an automatic current limit (ACL) value of the display panel based on the level of the supply voltage, and adjust a luminance gain of the input image data based on the ACL value to generate the data voltage.

2. The display device according to claim 1, wherein the timing controller sets the ACL value to be inversely proportional to a change in the level of the supply voltage.

3. The display device according to claim 1, wherein the timing controller sets the ACL value so that a target power calculated as a product of the level of the supply voltage and the ACL value is constant.

4. The display device according to claim 1, wherein the timing controller is further configured to:

detect a peak luminance of the input image data based on a peak luminance control (PLC) curve that defines a peak luminance of the plurality of pixels based on an average picture level (APL) of a frame of the input image data;

set the level of the supply voltage in units of the frame based on the detected peak luminance; and set the ACL value in units of the frame based on the EVDD level to generate the data voltage of the input image data.

5. The display device according to claim 4, wherein the timing controller is further configured to:

calculate a target power based on the level of the supply voltage and an ACL value, the level of the supply voltage and the ACL value are set when the APL is at a maximum level; and set the ACL value so that the target power is maintained with the ACL value inversely proportional to a change in the level of the supply voltage.

6. The display device according to claim 4, wherein the timing controller is further configured to:

calculate a target power based on the level of the supply voltage and an ACL value, the level of the supply voltage and the ACL value are set when the APL is at a minimum level; and set the ACL value so that the target power is maintained with the ACL value inversely proportional to a change in the level of the supply voltage.

7. The display device according to claim 1, wherein the timing controller is further configured to:

detect a peak luminance of a peak luminance control (PLC) curve that is set in the input image data to set the ACL value and the level of the supply voltage for displaying the input image data; and set the ACL value to be inversely proportional to a change in the level of the supply voltage when the level of the supply voltage changes according to a change of the PLC curve.

8. The display device according to claim 1, wherein the timing controller comprises:

a peak luminance detector configured to detect a peak luminance of the input image data;

a first controller configured to set the level of the supply voltage based on the peak luminance to output a supply voltage level setting signal;

a second controller configured to set the ACL value based on the level of the supply voltage; and a data voltage generator configured to adjust a luminance gain of the input image data based on the ACL value to generate the data voltage.

9. The display device according to claim 8, wherein the peak luminance detector comprises a third controller configured to detect the peak luminance of the input image data based on a peak luminance control (PLC) curve that defines a peak luminance of the plurality of pixels according to an APL of a frame of the input image data.

10. The display device according to claim 8, wherein the peak luminance detector comprises a peak luminance control (PLC) peak luminance detector configured to detect a peak luminance of a PLC curve that is set in the input image data.

11. The display device according to claim 8, wherein the second controller is further configured to:

calculate a target power based on the level of the supply voltage and an ACL value, the level of the supply voltage and the ACL value are set when the APL is at a maximum level; and set the ACL value so that the target power is maintained with the ACL value inversely proportional to a change in the level of the supply voltage.

12. The display device according to claim 8, wherein the second controller is further configured to:

calculate a target power based on the level of the supply voltage and an ACL value, the level of the supply voltage and the ACL value are set when the APL is at a minimum level; and set the ACL value so that the target power is maintained with the ACL value inversely proportional to a change in the level of the supply voltage.

13. A method of controlling a display device comprising a display panel including a plurality of pixels, each of the plurality of pixels having a light-emitting element that emits light based on current that corresponds to a data voltage, the method comprising:

detecting a peak luminance of input image data;

setting a level of a supply voltage of the display panel for displaying the input image data based on the detected peak luminance;

setting an automatic current limit (ACL) value of the display panel so that a target power value calculated as a product of the level of the supply voltage and the ACL value is constant; and adjusting a luminance gain of the input image data based on the ACL value to generate the data voltage.

14. The method according to claim 13, wherein detecting the peak luminance of the input image data comprises:

detecting the peak luminance of the input image data based on a peak luminance control (PLC) curve defining peak luminance of the pixels according to an average picture level (APL) of one frame of the input image data.

15. The method according to claim 14, wherein setting the level of the supply voltage to an EVDD level necessary to display the input image data according to the detected peak luminance comprises:

setting the EVDD level in units of the one frame according to the detected peak luminance.

16. The method according to claim 15, wherein setting the ACL value of the display panel comprises:

setting the ACL value in units of the one frame according to the EVDD level.

17. The method according to claim 13, wherein setting the ACL value comprises:

setting the ACL value to be inversely proportional to a change in the level of the supply voltage.

* * * * *